US009126234B2

(12) United States Patent
Kim

(10) Patent No.: US 9,126,234 B2
(45) Date of Patent: Sep. 8, 2015

(54) SYSTEM FOR AUTOMATICALLY SORTING MAILPOSTAL MATTER AND METHOD THEREOF

(71) Applicant: Electronics and Telecommunications Research Institute, Daejeon (KR)

(72) Inventor: Ki Hak Kim, Cheoungju-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 202 days.

(21) Appl. No.: 13/869,180

(22) Filed: Apr. 24, 2013

(65) Prior Publication Data

US 2014/0081446 A1 Mar. 20, 2014

(30) Foreign Application Priority Data

Sep. 17, 2012 (KR) ........................ 10-2012-0102807
Feb. 21, 2013 (KR) ........................ 10-2013-0018422

(51) Int. Cl.

*G06F 7/00* (2006.01)
*B07C 99/00* (2009.01)
*B07C 1/02* (2006.01)
*B07C 1/16* (2006.01)

(52) U.S. Cl.

CPC ... *B07C 9/00* (2013.01); *B07C 1/02* (2013.01); *B07C 1/16* (2013.01)

(58) Field of Classification Search

None
See application file for complete search history.

(56) References Cited

U.S. PATENT DOCUMENTS

| | | | | |
|---|---|---|---|---|
| 6,253,904 | B1 | 7/2001 | Soldavini | |
| 7,814,031 | B2 * | 10/2010 | Nicolas et al. | 705/400 |
| 2002/0017537 | A1 | 2/2002 | Barklin et al. | |
| 2003/0171845 | A1 * | 9/2003 | Flores et al. | 700/223 |
| 2011/0023422 | A1 * | 2/2011 | Takayama et al. | 53/495 |

FOREIGN PATENT DOCUMENTS

| | | | |
|---|---|---|---|
| CN | 1239062 | A | 12/1999 |
| KR | 10-2002-0043613 | A | 6/2002 |

OTHER PUBLICATIONS

SIPO Office Action for Chinese Patent Application No. 201310170719.5 which corresponds to the above-identified U.S. application.

* cited by examiner

*Primary Examiner* — Yolanda Cumbess
(74) *Attorney, Agent, or Firm* — LRK Patent Law Firm

(57) ABSTRACT

A system for automatically sorting a mailpostal matter and a method thereof are provided. The system for automatically sorting a mailpostal matter includes a mailpostal matter supply unit configured to convey two inputted mailpostal matters by controlling a distance between the two inputted mailpostal matters to be equal to a distance between carriers when the two mailpostal matters are inputted through one inlet at the same time, a mailpostal matter inserting unit, configured to insert the two conveyed mailpostal matters into two crossbelt carriers which are continuously empty at the same time when the two mailpostal matters are conveyed from the mailpostal matter supply unit, and a crossbelt carrier configured to move the two mailpostal matters inserted from the mailpostal matter inserting unit.

16 Claims, 7 Drawing Sheets

SYSTEM FOR AUTOMATICALLY SORTING MAILPOSTAL MATTER AND METHOD THEREOF

CROSS-REFERENCE TO RELATED APPLICATIONS

This application claims priority to and the benefit of Korean Patent Application No. 10-2012-0102807 filed on Sep. 17, 2012 and Korean Patent Application No. 10-2013-0018422 filed on Feb. 21, 2013 in the Korean Intellectual Property Office, the entire contents of which are incorporated herein by reference.

TECHNICAL FIELD

The present invention relates to a system for sorting a mailpostal matter, and particularly, to a system for automatically sorting a mailpostal matter and a method thereof in which when two mailpostal matters are inputted to one inlet at the same time, a distance between the mailpostal matters is calculated based on a thickness of the inputted mailpostal matter and one mailpostal matter moves by a distance between carriers or trays based on the calculated distance and then the two mailpostal matters are conveyed and inserted to the carriers or the trays.

BACKGROUND

Recently, with the growth of a parcel delivery service industry, a parcel quantity has increased every year. As a result, a mail center or a distribution center uses a mailpostal matter sorting system in order to efficiently classify mailpostal matters. New sorting apparatuses such as a crossbelt type, an E-Tray type, and the like have been developed and commercialized in order to increase a processing capacity of the mailpostal matters, and have been developed to sort from small mailpostal matters to large mailpostal matters.

Particularly, the E-ray and crossbelt type mailpostal matter sorting apparatuses have been developed and used so that the processing capacity of the mailpostal matters is 10,000 or more per hour at a track speed of 2.5 m/s or more.

However, since the track speed is fast as 2.5 m/s or more, a share of the mailpostal matters of the crossbelt carrier is significantly reduced. For example, when the track moves 2,500 mm per second, a distance between the carriers is 800 mm, and an operator inputs the mailpostal matters at an interval of 2 to 3 seconds, a first mailpostal matter is inputted to the carrier at induction and a second mailpostal matter is inputted after approximately 6 to 9 carriers are passed, and as a result, actual processing capacity deteriorates.

SUMMARY

The present invention has been made in an effort to provide a system for automatically sorting a mailpostal matter and a method thereof in which when two mailpostal matters are inputted to one inlet at the same time, a distance between the mailpostal matters is calculated based on a thickness of the inputted mailpostal matter and one mailpostal matter moves by a distance between carriers or trays based on the calculated distance, and then the two mailpostal matters are conveyed and inserted to the carriers or the trays.

However, the object of the present invention is not limited to the aforementioned description and other objects which are not mentioned above will be apparent to those skilled in the art from the disclosure to be described below.

An exemplary embodiment of the present invention provides a system for automatically sorting a mailpostal matter, including: a mailpostal matter supply unit configured to convey two inputted mailpostal matters by controlling a distance between the two inputted mailpostal matters to be equal to a distance between carriers when the two mailpostal matters are inputted through one inlet at the same time; a mailpostal matter inserting unit, configured to insert the two conveyed mailpostal matters into two crossbelt carriers which are continuously empty at the same time when the two mailpostal matters are conveyed from the mailpostal matter supply unit; and a crossbelt carrier configured to move the two mailpostal matters inserted from the mailpostal matter inserting unit.

The mailpostal matter supply unit may calculate a distance between the mailpostal matters while moving the two inputted mailpostal matters by using singulator conveyor belts, calculate a moving distance of one mailpostal matter so that, the calculated distance between the two mailpostal matters is equal to a distance between the carriers, and convey the two mailpostal matters to the mailpostal matter inserting unit after moving the one mailpostal matter based on the calculated moving distance.

The mailpostal matter supply unit may divide the two inputted mailpostal matters by using the singulator conveyor belts to move the divided mailpostal matters to respective edges thereof, and measure thicknesses of the mailpostal matters moved to the edges by using preinstalled sensors and then calculate a distance between the mailpostal matters by using the measured thicknesses of the two mailpostal matters and widths of the belts.

The mailpostal matter supply unit may arrange front ends of the two inputted mailpostal matters to be positioned on the same line, and convey the two mailpostal matters to the mailpostal matter inserting unit at the same time after moving the one mailpostal matter so that the distance between the two arranged mailpostal matters is equal to a distance between the carriers based on the calculated moving distance.

The mailpostal matter supply unit may calculate a distance between the mailpostal matters while moving the two inputted mailpostal matters by using singulator conveyor belts, calculate a moving distance of one mailpostal matter so that the calculated distance between the two mailpostal matters becomes a distance between the carriers, and convey the two mailpostal matters to the mailpostal matter inserting unit in sequence so that the distance between the two mailpostal matters is equal to a distance between the carriers based on the calculated moving distance.

The mailpostal matter supply unit may arrange front ends of the two inputted mailpostal matters to be positioned on the same line, and convey the two mailpostal matters to the mailpostal matter inserting unit in sequence so that the distance between the two arranged mailpostal matters is equal to a distance between the carriers based on the calculated moving distance.

The mailpostal matter inserting unit may verify whether two crossbelt carriers are continuously empty, when the two mailpostal matters are conveyed from the mailpostal matter supply unit, and may insert the two mailpostal matters into the two crossbelt carriers at the same time, when the two crossbelt carriers are continuously empty as the verified result.

The mailpostal matter inserting unit may stand by until two empty crossbelt carriers are verified when the two crossbelt carriers are not continuously empty as the verified result.

Another exemplary embodiment of the present invention provides a method for automatically sorting a mailpostal matter, including: conveying two inputted mailpostal matters by controlling a distance between the two inputted mailpostal matters to be equal to a distance between carriers when the two mailpostal matters are inputted through one inlet at the same time; inserting the two conveyed mailpostal matters into two crossbelt carriers which are continuously empty at the same time when, the two mailpostal matters are conveyed from the mailpostal matter supply unit; and moving the two mailpostal matters inserted from the mailpostal matter inserting unit through crossbelt carriers.

The conveying comprises calculating a distance between the mailpostal matters while moving the two inputted mailpostal matters by using singulator conveyor belts, calculating a moving distance of one mailpostal matter so that the calculated distance between the two mailpostal matters is equal to a distance between the carriers, and conveying one mailpostal matter to the mailpostal matter inserting unit after moving the one mailpostal matter based on the calculated moving distance.

The conveying comprises dividing the two inputted mailpostal matters by using the singulator conveyor belts to move to respective edges thereof, and measuring thicknesses of the mailpostal matters moved to the edges by using preinstalled sensors and then calculating a distance between the mailpostal matters by using the measured thicknesses of the two mailpostal matters and widths of the belts.

The conveying comprises arranging front ends of the two inputted mailpostal matters to be positioned on the same line, and conveying the two mailpostal matters to the mailpostal matter inserting unit at the same time after moving the one mailpostal matter so that the distance between the two arranged mailpostal matters is equal to a distance between the carriers based on the calculated moving distance.

The conveying comprises calculating a distance between the mailpostal matters while moving the two inputted mailpostal matters by using singulator conveyor belts, calculating a moving distance of one mailpostal matter so that the calculated distance between the two mailpostal matters is equal to a distance between the carriers, and conveying the two mailpostal matters to the mailpostal matter inserting unit in sequence based on the calculated moving distance so that the distance between the two mailpostal matters is equal to a distance between the carriers.

The conveying comprises arranging front ends of the two inputted mailpostal matters to be positioned on the same line, and conveying the two mailpostal matters to the mailpostal matter inserting unit in sequence based on the calculated moving distance so that the distance between the two arranged mailpostal matters is equal to a distance between the carriers.

The inserting comprises verifying whether two crossbelt carriers are continuously empty when the two mailpostal matters are conveyed from the mailpostal matter supply unit, and inserting the two mailpostal matters into the two empty crossbelt carriers at the same time, when the two crossbelt carriers are continuously empty as the verified result.

The inserting comprises standing the two mailpostal matters by until two empty crossbelt carriers are verified when the two crossbelt carriers are not continuously empty as the verified result.

According to the exemplary embodiments of the present invention, it is possible to increase processing capacity of the mailpostal matters by calculating a distance between the mailpostal matters based on a thickness of the inputted mailpostal matter when two mailpostal matters are inputted through one inlet at the same time, moving one mailpostal matter by a distance between carriers or trays based on the calculated distance, and then conveying the mailpostal matters to insert the conveyed mailpostal matters to the carrier or the tray.

It is possible to improve space efficiency because two existing apparatuses are reduced to one apparatus by inserting two postal matters to the carrier or the tray at the same time.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 3A and 38 ARE diagrams for describing an operational principle of the mailpostal matter supply unit according to the exemplary embodiment of the present invention.

Figure 1:
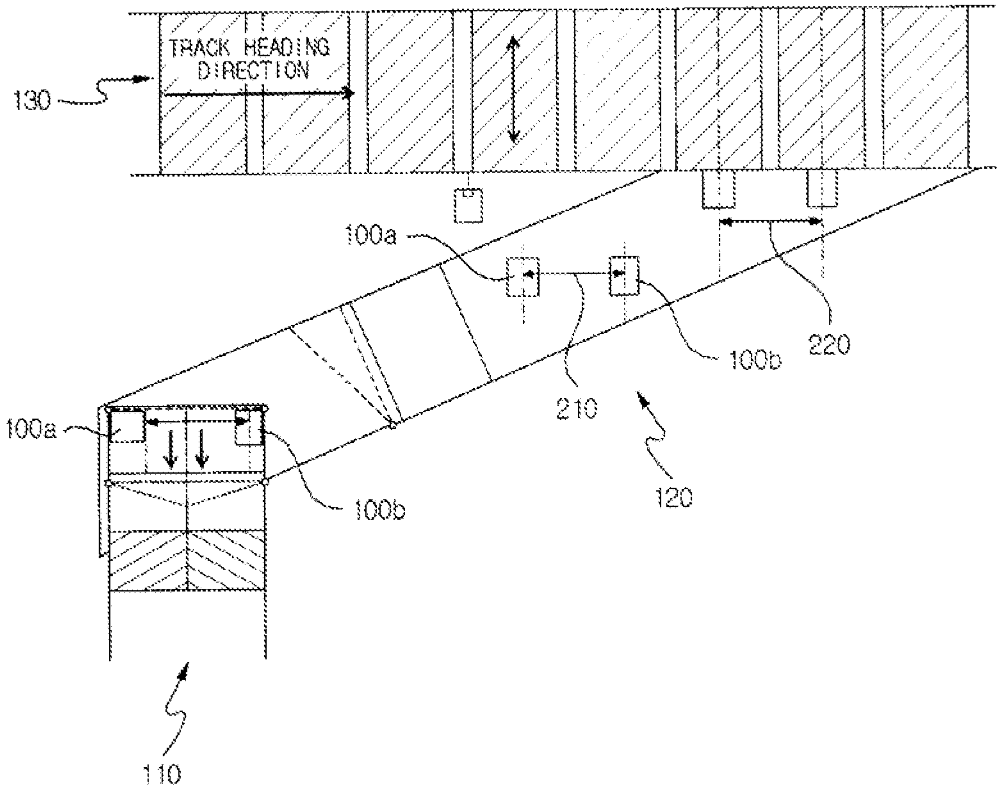
FIG. 1 is a first diagram illustrating a system for automatically sorting a mailpostal matter according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings.

Particularly, the present invention provides a new aspect in which when two mailpostal matters are inputted to one inlet at the same time, a distance between the mailpostal matters is calculated based on a thickness of the inputted mailpostal matter and one mailpostal matter moves by a distance between carriers or trays based on the calculated distance and then is conveyed to be inserted to the carrier or the tray.

FIG. 1 is a first diagram illustrating a system for automatically sorting a mailpostal matter according to an exemplary embodiment of the present invention.

As illustrated in FIG. 1, a system for automatically sorting a mailpostal matter according to the present invention may include a mailpostal matter supply unit 110, a mailpostal matter inserting unit 120, a crossbelt carrier 130, and the like. Here, a crossbelt type mailpostal matter sorting system will be described as an example.

When an operator inputs two mailpostal matters through one inlet at the same time, the mailpostal matter supply unit 110 may move each of the two inputted mailpostal matters to a predetermined position by using a singulator conveyor belt.

In this case, the predetermined position means an edge in each singulator conveyor belt.

The mailpostal matter supply unit 110 measures a thickness of the mailpostal matter moved to the predetermined position and may calculate a distance between the centers of the mailpostal matters based on the measured thickness of the mailpostal matter and a width of the belt.

The mailpostal matter supply unit 110 arranges front ends of the mailpostal matters to be positioned on the same line and moves one mailpostal matter by a distance between the carriers or the trays based on the calculated distance between the centers of the mailpostal matters, and then conveys the two mailpostal matters to the mailpostal matter inserting unit 120.

The mailpostal matter inserting unit 120 may insert the two conveyed mailpostal matters to the crossbelt carrier 130. That is, the mailpostal matter inserting unit 120 verifies whether two crossbelt carriers are continuously empty when the two mailpostal matters are conveyed, and inserts the two mailpostal matters to the two empty crossbelt carriers at the same time when the crossbelt carriers are empty as the verified result.

In this case, the mailpostal matter inserting unit 120 may be formed to obliquely cross the two mailpostal matters at a predetermined angle, in order to insert the two mailpostal matters to the crossbelt carriers 130 at the same time.

Figure 2:
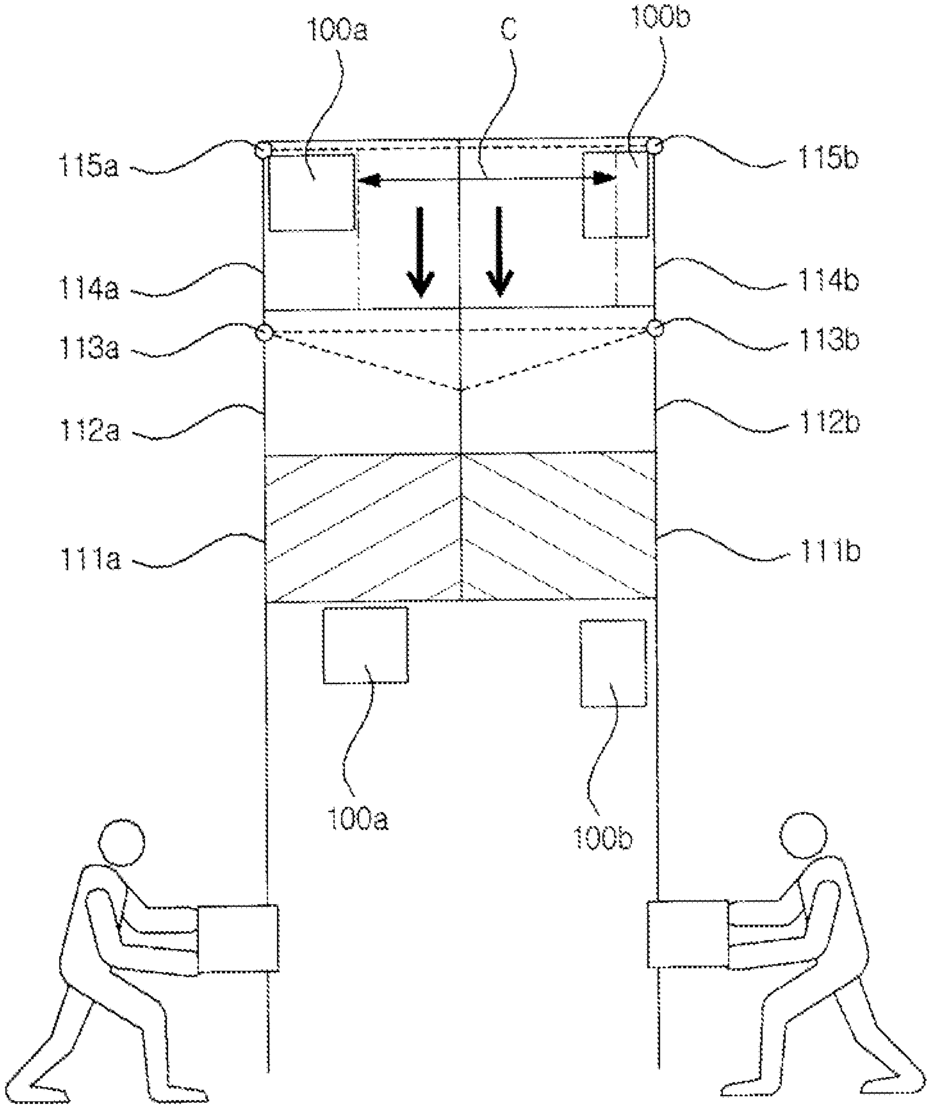
FIG. 2 is a diagram illustrating a detailed configuration of a mailpostal matter supply unit according to the exemplary embodiment of the present invention.

FIG. 2 is a diagram illustrating a detailed configuration of a mailpostal matter supply unit according to the exemplary embodiment of the present invention.

As illustrated in FIG. 2, when the two mailpostal matters are inputted through one inlet from the operator at the same time, the mailpostal matter supply unit 110 according to the present invention divides the two inputted mailpostal matters by using singulator conveyor belts 111*a* and 111*b* to move the divided mailpostal matters to edges of the singulator conveyor belts 111*a* and 111*b* in a first section.

Next, the mailpostal matter supply unit 110 may measure thicknesses of the mailpostal matters which are moved to the edges by using sensors 113*a* and 113*b* installed in the belts 112*a* and 112*b* in a second section. Here, the sensor used to measure the thickness of the mailpostal matter may include, for example, a diagonal sensor, a horizontal sensor, and the like.

The mailpostal matter supply unit 110 calculates a distance between the mailpostal matters by using the measured thicknesses and widths of the belts, and calculates a moving distance of one mailpostal matter so that the calculated distance between the mailpostal matters becomes a distance between the carriers or the trays, and then moves the mailpostal matters to a slide device.

Next, the mailpostal matter supply unit 110 arranges the front ends of the mailpostal matters to be positioned on the same line by using the sliding units 114*a* and 114*b* in a third section and may move one mailpostal matter so that a distance between the arranged mailpostal matters becomes a distance between the carriers or the trays based on the calculated moving distance of one mailpostal matter.

In this case, the mailpostal matter supply unit 110 may recognize the arranged mailpostal matters by using pre installed sensors 115*a* and 115*b*.

The mailpostal matter supply unit 110 may vertically convey the two mailpostal matters which are spaced apart from each other by the distance between the carriers or the trays to the mailpostal matter inserting unit 120 by using the sliding units.

As such, the mailpostal matter supply unit according to the present invention requires two main functions, and for example, includes a first function that, the front ends of the mailpostal matters are disposed at the same position, and a second function that the distance between two mailpostal matters is positioned by the distance between the carriers or the trays.

Figure 3A:
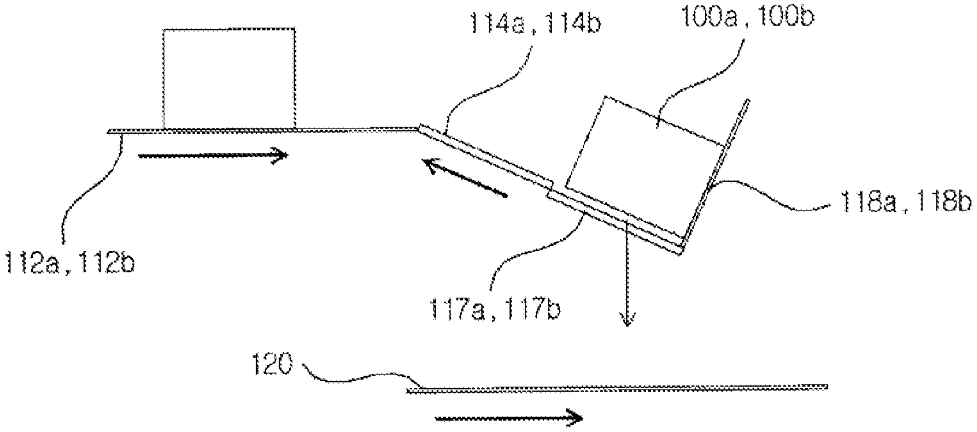
Figure 3B:
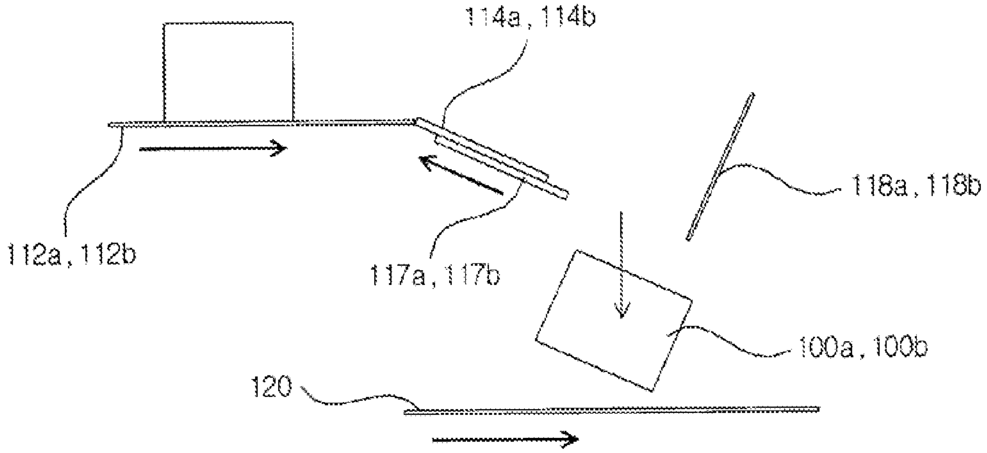

FIGS. 3A and 3B are diagrams illustrating a sliding unit of the mailpostal matter supply unit according to the exemplary embodiment of the present invention.

As illustrated in FIGS. 3A and 3B, the sliding units 114*a* and 114*b* of the mailpostal matter supply unit according to the present invention may serve to arrange respective front ends of mailpostal matters 100*a* and 100*b* to be positioned on the same line, form a distance between the mailpostal matters by the distance between the carriers or the trays, and vertically drop the mailpostal matters to the mailpostal matter inserting unit 120.

The sliding units 114*a* and 114*b* are formed to be inclined at a predetermined angle, and the ends 118*a* and 118*b* thereof have closed structures. Like FIG. 3A, in the first and second sections, when the conveyor belts 112*a* and 112*b* move, the mailpostal matters enter the sliding units 114*a* and 114*b* inclined at the predetermined angle to slide down up to ends of the sliding units.

Like FIG. 3B, the mailpostal matters arranged at the ends of the sliding units 114*a* and 114*b* slide along lower slide windows 117*a* and 117*b* as one side so as to vertically drop the mailpostal matters to the mailpostal matter inserting unit 120 below.

As such, the mailpostal matter supply unit according to the present invention needs to use a sliding method in order to convey the mailpostal matters to the belt of the mailpostal matter inserting unit. The reason is that when the belt type is used, the front ends of the mailpostal matters are different at the belt of the mailpostal matter inserting unit according to a length of the mailpostal matter, and as a result, two or more mailpostal matters cannot be inserted at the same time.

Figure 4:
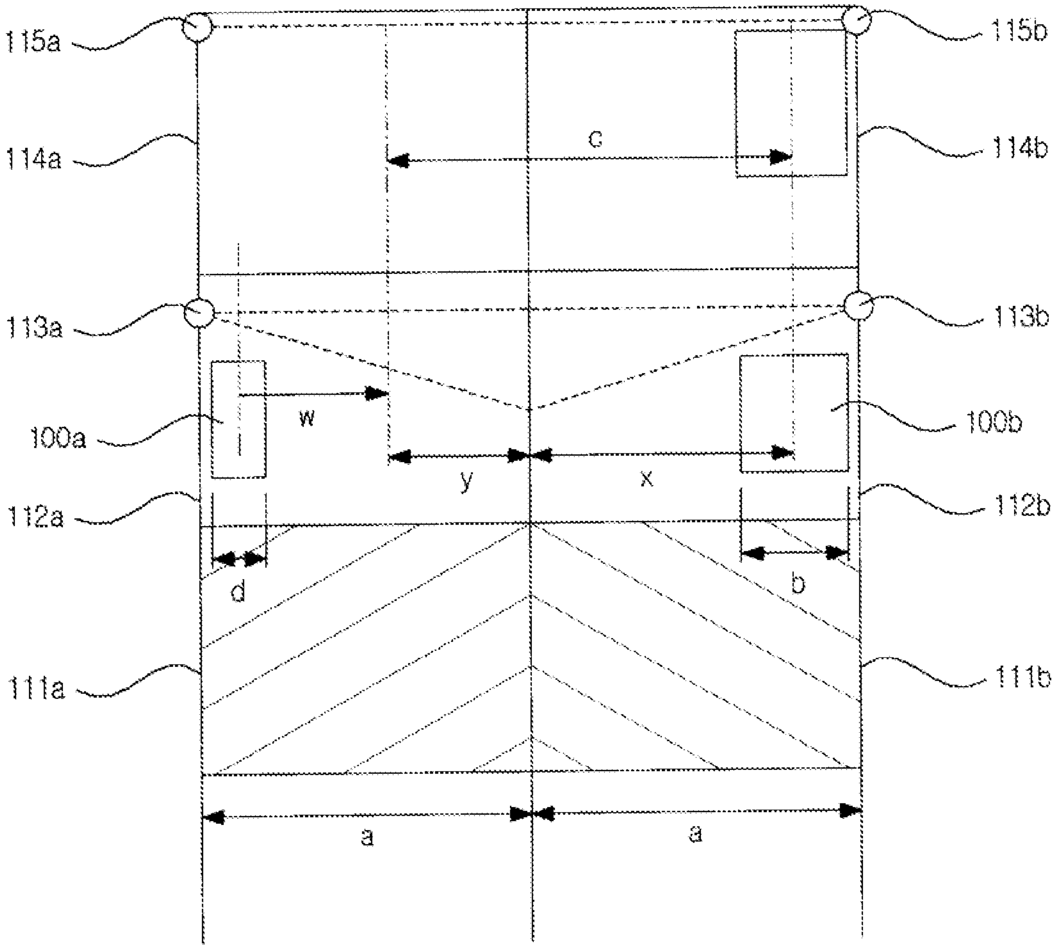
FIG. 4 is a diagram for describing a process of forming a distance between mailpostal matters according to the exemplary embodiment of the present invention.

FIG. 4 is a diagram for describing a process of forming a distance between mailpostal matters according to the exemplary embodiment of the present invention.

As illustrated in FIG. 4, the sliding unit of the mailpostal matter supply unit according to the present invention forms the distance between the two mailpostal matters 100*a* and 100*b* by the distance between the carriers or the trays, that is, may move one mailpostal matter by a pre-calculated moving distance by using a pre-measured thickness.

A method of forming the distance between the mailpostal matters will be described by using the following Equation 1.

$$x+y=c,\ x=a-b/2,\ y=a-d/2-w \qquad \text{[Equation 1]}$$

Here, c represents a distance between the carriers, x represents a distance from the center of the mailpostal matter supply unit to the center of a right mailpostal matter, w represents a distance to move to the center of a left mailpostal matter, y represents a distance from the center of the mailpostal matter supply unit to a position where the center of the left mailpostal matter moves, a represents a half of a width of the mailpostal matter supply unit, b represents a thickness of the right mailpostal matter, and d represents a thickness of the left mailpostal matter.

The sliding unit moves the left mailpostal matter by w to form the distance between the carriers, and as the method, first, a method of moving the left mailpostal matter to the center of the mailpostal matter supply unit by w by using a separate physical device, and second, a method of moving the left mailpostal matter by w by controlling an operational time of the slide window are included.

For example, when it is assumed that a speed of the belt of the mailpostal matter inserting unit is 1,400 mm/s, the moving distance w is divided by 1,400 to acquire a time value z, and the distance between the left and right mailpostal matters may be formed to be equal to the distance between the carriers by operating the slide window just after the acquired time value z. That is, the distance may be formed by controlling a time when the left mailpostal matter and the right mailpostal matter are separated from each other.

Figure 5:
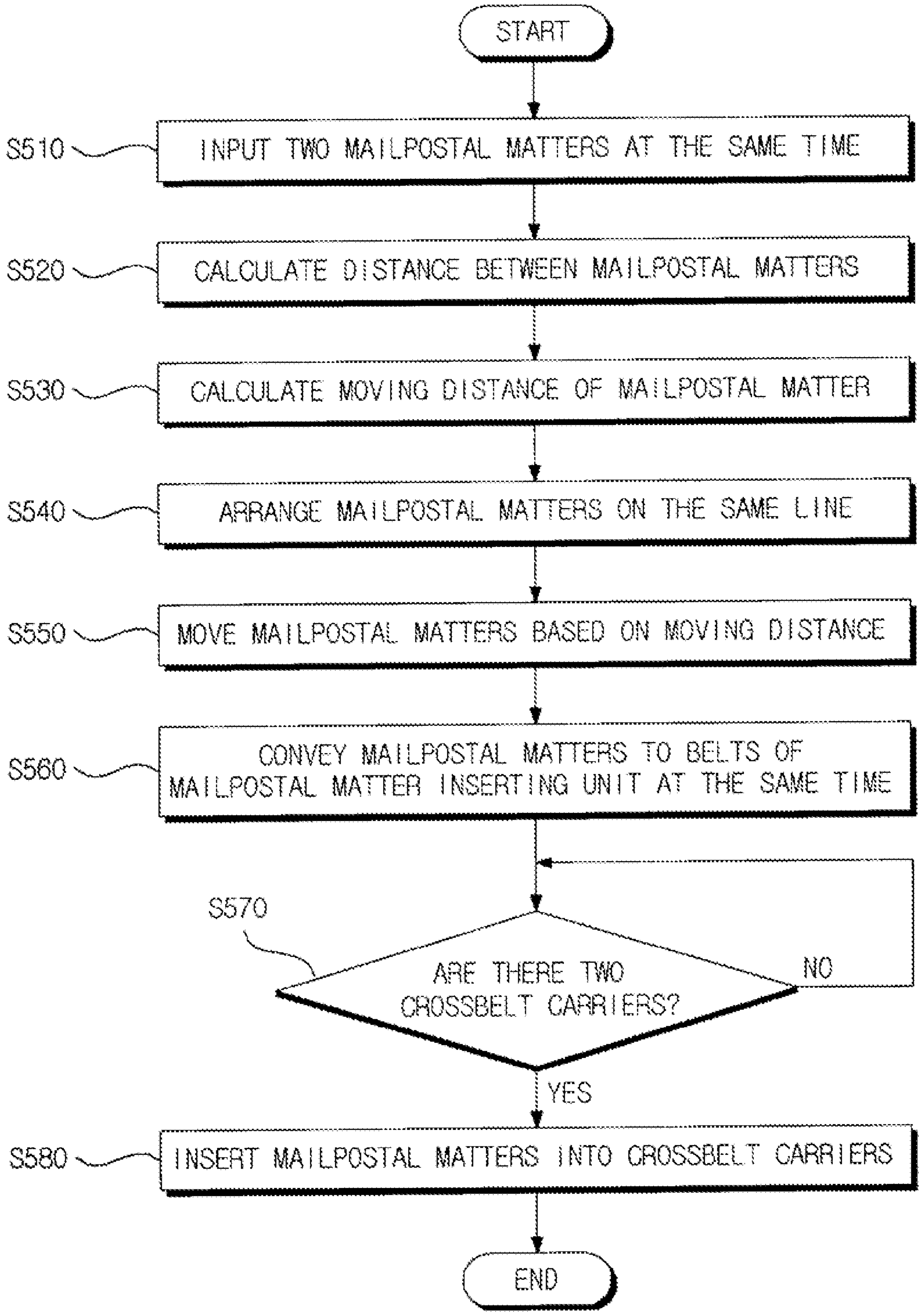
FIG. 5 is a first diagram illustrating a method for automatically sorting a mailpostal matter according to another exemplary embodiment of the present invention.

FIG. 5 is a first diagram illustrating a method for automatically sorting a mailpostal matter according to another exemplary embodiment of the present invention.

As illustrated in FIG. 5, when two mailpostal matters are inputted through one inlet from an operator at the same time (S510), a system for automatically sorting a mailpostal matter according to the present invention (hereinafter, referred to as a system for sorting a mailpostal matter) may calculate a distance between the mailpostal matters while moving the two inputted mailpostal matters by using singulator conveyor belts (S520).

Next, the system for sorting the mailpostal matter may calculate a moving distance of one mailpostal matter at one side so that the calculated distance between the mailpostal matters is equal to a distance between carriers or trays (S530).

In detail, the system for sorting the mailpostal matter divides the two inputted mailpostal matters by using the singulator conveyor belts to move the divided mailpostal matters to respective edges of the singulator conveyor belts, measures a thickness of the mailpostal matter which is moved to the edge by using a preinstalled sensor, and then calculates a distance between the mailpostal matters by using the measured thickness of the two mailpostal matters and a width of the belt.

Next, the system for sorting the mailpostal matter arranges front ends of the two mailpostal matters to be positioned on the same line (S540) and may move one mailpostal matter so that a distance between the arranged mailpostal matters is equal to a distance between the carriers or the trays based on the calculated moving distance of one mailpostal matter (S550).

Next, the system for sorting the mailpostal matter may vertically convey the two mailpostal matters which are spaced apart from each other by the distance between the carriers or the trays to belts of a mailpostal matter inserting unit by using sliding units (S560).

Next, the system for sorting the mailpostal matter verifies whether two crossbelt carriers are continuously empty when the two mailpostal matters are conveyed at the distance between the carriers or the trays (S570), and as the verified result, when the two crossbelt carriers are continuously empty, the two mailpostal matters may be inserted into the two empty crossbelt carriers at the same time (S580).

Meanwhile, as the verified result, when the two crossbelt carriers are not continuously empty, the system for sorting the mailpostal matter stands by.

Figure 6:
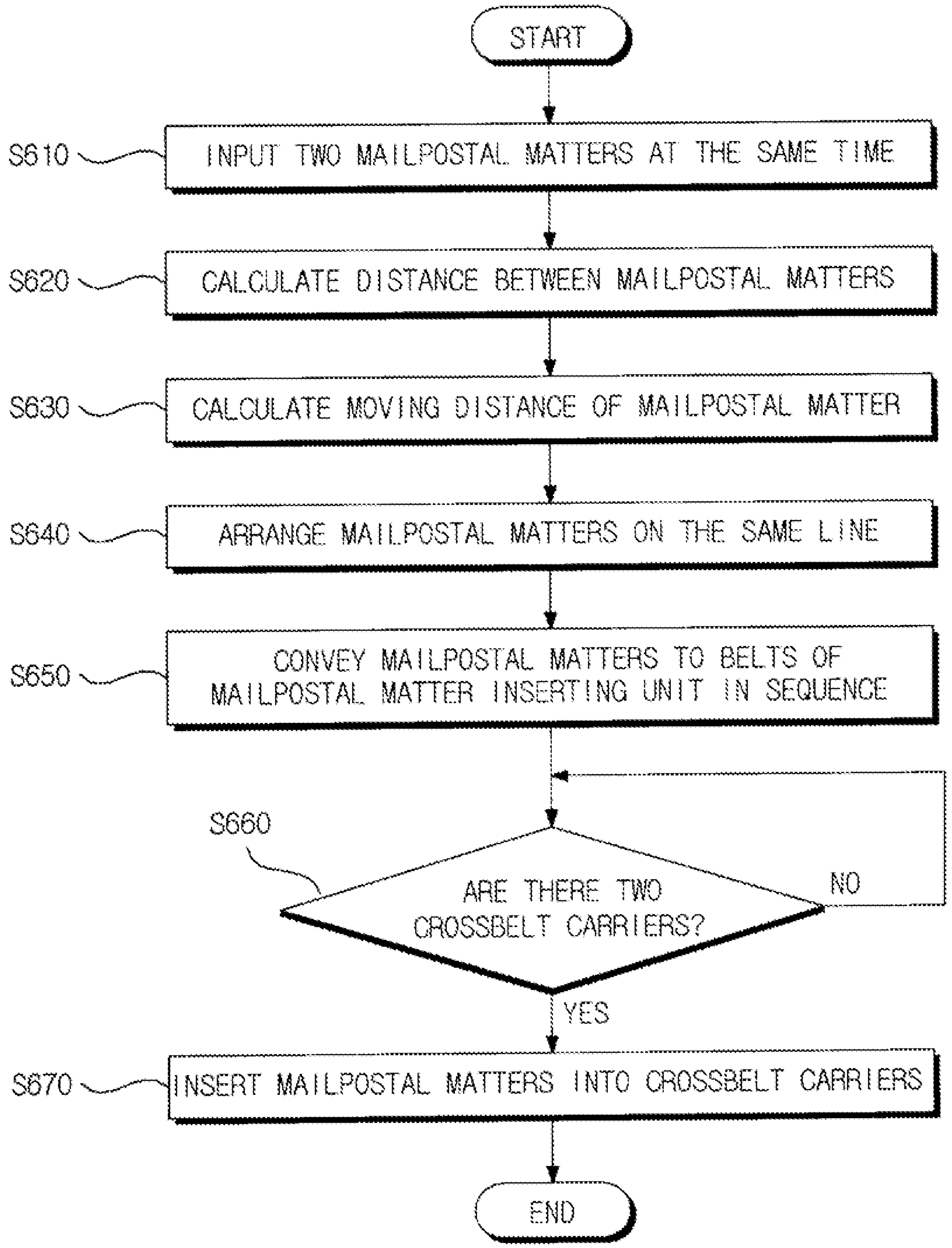
FIG. 6 is a second diagram illustrating a method for automatically sorting a mailpostal matter according to another exemplary embodiment of the present invention.

FIG. 6 is a second diagram illustrating a method for automatically sorting a mailpostal matter according to another exemplary embodiment of the present invention.

As illustrated in FIG. 6, when two mailpostal matters are inputted through one inlet from an operator at the same time (S610), a system for automatically sorting a mailpostal matter according to the present invention (hereinafter, referred to as a system for sorting a postal matter) may calculate a distance between the mailpostal matters while moving the two inputted mailpostal matters by using singulator conveyor belts (S620).

Next, the system for sorting the mailpostal matter may calculate a moving distance of one mailpostal matter at one side so that the calculated distance between the mailpostal matters is equal to a distance between carriers or trays (S630).

In detail, the system for sorting the mailpostal matter divides the two inputted mailpostal matters by using the singulator conveyor belts to move the divided mailpostal matters to respective edges of the singulator conveyor belts, measures a thickness of the mailpostal matter which is moved to the edge by using a preinstalled sensor, and then calculates a distance between the mailpostal matters by using the measured thickness of the two mailpostal matters and a width of the belt.

Next, the system for sorting the mailpostal matter arranges front ends of the mailpostal matters to be positioned on the same line (S640) and may vertically convey the two mailpostal matters to belts of a mailpostal matter inserting unit in sequence by using sliding units based on the calculated moving distance of one mailpostal matter (S650).

Next, the system for sorting the mailpostal matter verifies whether two crossbelt carriers are continuously empty when the two mailpostal matters are conveyed at the distance between the carriers or the trays (S660), and as the verified result, when the two crossbelt carriers are continuously empty, the two mailpostal matters may be inserted into the two empty crossbelt carriers at the same time (S670).

Meanwhile, as the verified result, when the two crossbelt carriers are not continuously empty, the system for sorting the mailpostal matter stands by.

Figure 7:
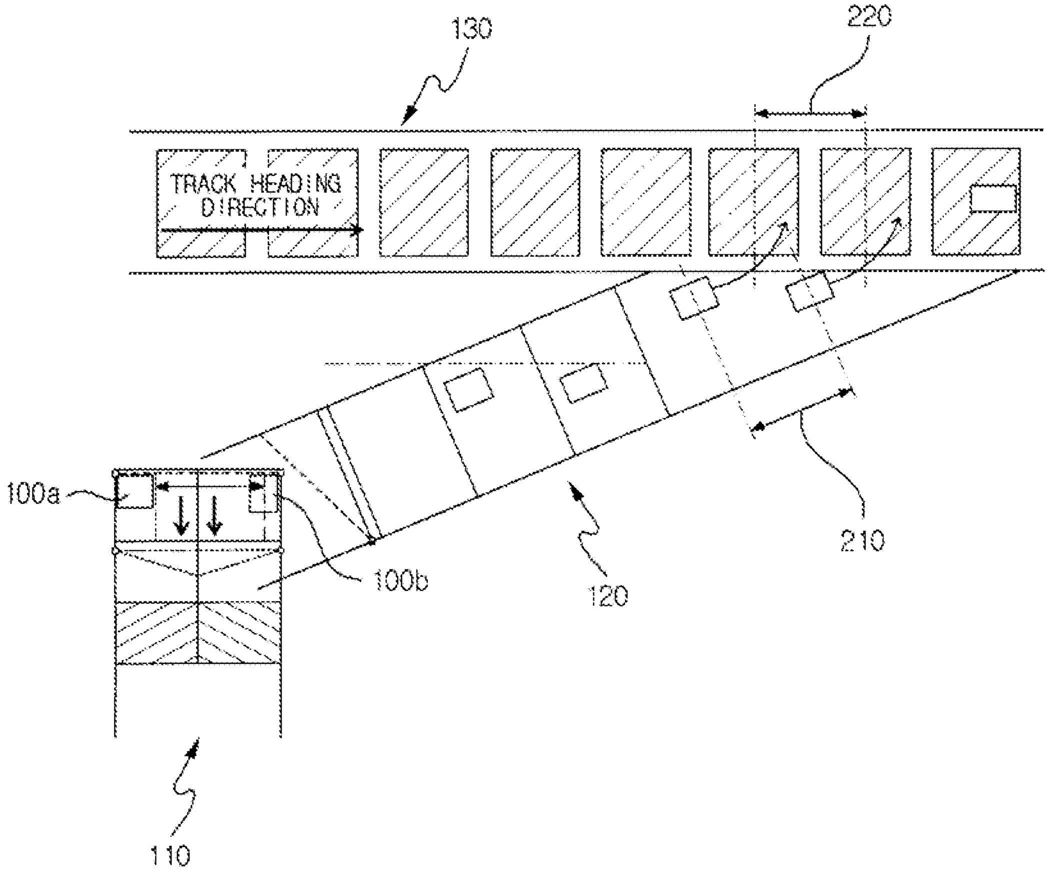
FIG. 7 is a second diagram illustrating a system for automatically sorting a mailpostal matter according to the exemplary embodiment of the present invention.

FIG. 7 is a second diagram illustrating a system for automatically sorting a mailpostal matter according to the exemplary embodiment of the present invention.

As illustrated in FIG. 7, a system for automatically sorting a mailpostal matter according to the present invention may include a mailpostal matter supply unit 110, a mailpostal matter inserting unit 120, a crossbelt carrier 130, and the like, here, a tilt tray type system for sorting a mailpostal matter will be described as another example.

Since the system for sorting the mailpostal matter has the same configuration and operational principle described in FIG. 1, hereinafter, the description thereof will be omitted. However, only a difference from FIG. 1 will be described.

In the case of the tilt tray type, a vertical distance 210 between the mailpostal matters needs to coincide with a distance 220 between trays, and respective front and left edges of the mailpostal matters need to be disposed at the same position. Similarly to the crossbelt type system, for sorting the mailpostal matter described in FIG. 1, when the tilt tray type system for sorting the mailpostal matter is fabricated so that two or more mailpostal matters may be inserted into the mailpostal matter supply unit at the same time and a control technique suitable for the system is applied, the two or more mailpostal matters may be inserted into the mailpostal matter supply unit.

That is, the present invention may be applied to both the crossbelt type system and the tilt tray type system.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can foe used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit, and scope of the invention are deemed to be covered by the invention which is limited only by the claims which follow.

What is claimed is:

1. A system for automatically sorting mailpostal matters, comprising:

- a mailpostal matter supply unit configured to, when two mailpostal matters are simultaneously inputted through an inlet of the mailpostal matter supply unit, convey the two mailpostal matters while controlling a distance between the two mailpostal matters to be equal to a distance between two adjacent ones of a plurality of crossbelt carriers;
- a mailpostal matter inserting unit configured to, when the two mailpostal matters are conveyed from the mailpostal matter supply unit, insert the two mailpostal matters simultaneously into the two adjacent crossbelt carriers if the two adjacent crossbelt carriers are empty; and
- each of the crossbelt carriers are configured to move the two mailpostal matters inserted from the mailpostal matter inserting unit.

2. The system of claim 1, wherein the mailpostal matter supply unit:

- calculates a distance between the two mailpostal matters while moving the two mailpostal matters using singulator conveyor belts,
- calculates a moving distance of a first one of the two mailpostal matters so that the calculated distance between the first mailpostal matter and a second one of the two mailpostal matters is equal to a distance between the two adjacent crossbelt carriers, and
- conveys the two mailpostal matters to the mailpostal matter inserting unit after moving the first mailpostal matter by the calculated moving distance of the first mailpostal matter.

3. The system of claim 2, wherein the mailpostal matter supply unit:

- divides the two mailpostal matters using the singulator conveyor belts to move each of the two mailpostal matters to respective edges of the singulator conveyor belts, and
- measures thicknesses of the two mailpostal matters moved to the edges of the singulator conveyor belts using sensors installed in belts connected to the singulator conveyor belts, and then calculates a distance between the two mailpostal matters by using the measured thicknesses of the two mailpostal matters and widths of the belts.

4. The system of claim 2, wherein the mailpostal matter supply unit:

- arranges are front ends of the two mailpostal matters to be aligned with each other, and
- conveys the two mailpostal matters to the mailpostal matter inserting unit at the same time after moving the first one of the two mailpostal matters so that the distance between the two arranged mailpostal matters is equal to the distance between the two adjacent crossbelt carriers based on the calculated moving distance of the first mailpostal matter.

5. The system of claim 1, wherein the mailpostal matter supply unit:

- calculates a distance between the two mailpostal matters while moving the two mailpostal matters using singulator conveyor belts,
- calculates a moving distance of a first one of the two mailpostal matters so that the calculated distance between the two mailpostal matters is equal to a distance between the two adjacent crossbelt carriers, and
- conveys the two mailpostal matters to the mailpostal matter inserting unit in sequence so that the distance between the two mailpostal matters is equal to a distance between the two adjacent crossbelt carriers based on the calculated moving distance of the first mailpostal matter.

6. The system of claim 5, wherein the mailpostal matter supply unit:

- arranges front ends of the two mailpostal matters to be aligned with each other, and
- conveys the two mailpostal matters to the mailpostal matter inserting unit in sequence so that the distance between the two arranged mailpostal matters is equal to the distance between the two adjacent crossbelt carriers based on the calculated moving distance of the first mailpostal matter.

7. The system of claim 1, wherein the mailpostal matter inserting unit:

- determines whether two adjacent crossbelt carriers are continuously empty, when the two mailpostal matters are conveyed from the mailpostal matter supply unit, and inserts the two mailpostal matters simultaneously into the two adjacent crossbelt carriers, when the two adjacent crossbelt carriers are are verified to be empty.

8. The system of claim 1, wherein the mailpostal matter inserting unit:

remains in a stand-by mode when the two adjacent crossbelt carriers are determined to be not continuously empty, and remains in stand-by until two empty adjacent crossbelt carriers are verified.

9. A method for automatically sorting mailpostal matters, comprising:

conveying, when two mailpostal matters are simultaneously inputted through an inlet of a mailpostal matter supply unit, the two mailpostal matters while controlling a distance between the two mailpostal matters to be equal to a distance between two adjacent ones of a plurality of crossbelt carriers;

inserting, when the two mailpostal matters are conveyed from the mailpostal matter supply unit, the two mailpostal matters simultaneously into the two adjacent crossbelt carriers if the two adjacent crossbelt carriers are empty; and moving the two mailpostal matters through the two adjacent crossbelt carriers.

10. The method of claim 9, wherein the conveying of the two mailpostal matters comprises:

calculating a distance between the two mailpostal matters while moving the two mailpostal matters using singulator conveyor belts, calculating a moving distance of a first one of the two mailpostal matters so that the calculated distance between the first mailpostal matter and a second one of the two mailpostal matters is equal to a distance between the two adjacent crossbelt carriers, and conveying the two mailpostal matters to the mailpostal matter inserting unit after moving the first mailpostal matter by the calculated moving distance of the first mailpostal matter.

11. The method of claim 10, wherein the conveying comprises:

dividing the two mailpostal matters using the singulator conveyor belts to move each of the two mailpostal matters to respective edges of the singulator conveyor belts, measuring thicknesses of the two mailpostal matters moved to the edges of the singulator conveyor belts using sensors installed in belts connected to the singulator conveyor belts, and calculating a distance between the two mailpostal matters by using the measured thicknesses of the two mailpostal matters and width of the belts.

12. The method of claim 10, wherein the conveying comprises:

arranging front ends of the two mailpostal matters to be aligned with each other, and conveying the two mailpostal matters to the mailpostal matter inserting unit at the same time after moving the first one of the two mailpostal matters so that the distance between the two arranged mailpostal matters is equal to the distance between the two adjacent crossbelt carriers based on the calculated moving distance of the first mailpostal matter.

13. The method of claim 9, wherein the conveying comprises:

calculating a distance between the two mailpostal matters while moving the two mailpostal matters using singulator conveyor belts, calculating a moving distance of a first one of the two mailpostal matters so that the calculated distance between the two mailpostal matters is equal to a distance between the two adjacent crossbelt carriers, and conveying the two mailpostal matters to the mailpostal matter inserting unit in sequence based on the calculated moving distance of the first mailpostal matter so that the distance between the two mailpostal matters is equal to a distance between the two adjacent crossbelt carriers.

14. The method of claim 13, wherein the conveying comprises:

arranging front ends of the two mailpostal matters to be aligned with each other, and conveying the two mailpostal matters to the mailpostal matter inserting unit in sequence based on the calculated moving distance of the first mailpostal matter so that the distance between the two arranged mailpostal matters is equal to the distance between the two adjacent crossbelt carriers.

15. The method of claim 9, wherein the inserting comprises:

determining whether two adjacent crossbelt carriers are continuously empty, when the two mailpostal matters are conveyed from the mailpostal matter supply unit, and inserting the two mailpostal matters simultaneously into the two adjacent crossbelt carriers, when the two adjacent crossbelt carriers are are verified to be empty.

16. The method of claim 9, wherein the inserting comprises:

entering stand-by mode when the two adjacent crossbelt carriers are determined to be not continuously empty, and remaining in stand-by until two empty crossbelt carriers are verified.

* * * * *